(12) United States Patent
Kwak et al.

(10) Patent No.: US 7,649,657 B2
(45) Date of Patent: Jan. 19, 2010

(54) ADAPTIVE METHOD AND APPARATUS FOR ADJUSTMENT OF PIXELS IN A COLOR GAMUT BASED ON A REFERENCE TARGET COLOR

(75) Inventors: Young-shin Kwak, Suwon-si (KR); Seong-deok Lee, Suwon-si (KR); Ji-young Hong, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 405 days.

(21) Appl. No.: 11/603,064

(22) Filed: Nov. 22, 2006

(65) Prior Publication Data
US 2007/0139677 A1    Jun. 21, 2007

(30) Foreign Application Priority Data
Dec. 15, 2005    (KR) ...................... 10-2005-0123991

(51) Int. Cl.
*G03F 3/08*    (2006.01)
(52) U.S. Cl. ......................... 358/518; 358/1.9; 358/524; 345/600
(58) Field of Classification Search .................. 358/1.9, 358/515, 518, 523; 382/162, 167; 345/590, 345/600
See application file for complete search history.

(56) References Cited

U.S. PATENT DOCUMENTS

| | | | | |
|---|---|---|---|---|
| 5,319,473 A | * | 6/1994 | Harrington | 358/501 |
| 5,937,089 A | * | 8/1999 | Kobayashi | 382/167 |
| 6,724,507 B1 | * | 4/2004 | Ikegami et al. | 358/518 |
| 7,167,277 B2 | * | 1/2007 | Shimizu et al. | 358/1.9 |
| 2002/0126302 A1 | * | 9/2002 | Fukao | 358/1.9 |
| 2004/0151370 A1 | | 8/2004 | Sasaki | |
| 2004/0156544 A1 | | 8/2004 | Kajihara | |
| 2004/0169889 A1 | * | 9/2004 | Sawada | 358/518 |
| 2005/0001907 A1 | * | 1/2005 | Hoshuyama | 348/222.1 |
| 2006/0119870 A1 | * | 6/2006 | Ho et al. | 358/1.9 |

FOREIGN PATENT DOCUMENTS

| | | |
|---|---|---|
| JP | 09-326941 A | 12/1997 |
| JP | 2004-44469 A | 2/2004 |
| JP | 2004-192614 A | 7/2004 |
| JP | 2004-215235 A | 7/2004 |
| KR | 10-2005-0024238 A | 3/2005 |

\* cited by examiner

*Primary Examiner*—Kimberly A Williams
(74) *Attorney, Agent, or Firm*—Sughrue Mion, PLLC

(57) ABSTRACT

A method and apparatus for an image adaptive color adjustment of pixels in a color gamut is disclosed. The method includes calculating a representative value that shows color characteristics of pixels included in a color gamut, calculating a final target color required to convert the representative value to approach a reference target point existing in the color gamut, and converting the pixels included in the color gamut to approach the final target color. The apparatus includes a color gamut boundary storage module; a reference target point storage module; a target color determination module which calculates a representative value that shows color characteristics of pixels included in a color gamut and calculates a final target color required to convert the representative value to approach the reference target point; and a color conversion module which converts the pixels included in the color gamut to approach the final target color.

19 Claims, 9 Drawing Sheets

ADAPTIVE METHOD AND APPARATUS FOR ADJUSTMENT OF PIXELS IN A COLOR GAMUT BASED ON A REFERENCE TARGET COLOR

CROSS-REFERENCE TO RELATED APPLICATION

This application is based on and claims priority from Korean Patent Application No. 10-2005-0123991, filed on Dec. 15, 2005, the disclosure of which is incorporated herein in its entirety by reference.

BACKGROUND OF THE INVENTION

1. Field of the Invention

Methods and apparatuses consistent with the present invention relate to the color characteristic conversion of pixels included in an image and, more particularly, to image adaptive color adjustment of pixels in a color gamut.

2. Description of the Related Art

The memory color conversion technology is used for output software or a display device, which outputs an image or a moving image, and improves picture quality by making it possible to convert a color susceptible to human eyes, such as a skin color or blue sky, into a preferred color. Conventionally, in order to convert such a color into a preferred color, color conversion has been made in one direction. In this case, a problem occurs in that unintended results may occur depending on the state of an input image.

Also, since a single target value selected by a user or a system is used as an image, color conversion is performed without consideration of the characteristics of the image. In other words, if a color conversion parameter is once set, it is used for all input images. In this case, a problem occurs in that an effect of color conversion is reduced in comparison with color conversion performed considering the characteristics of the input image.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a method and apparatus for an image adaptive color adjustment of pixels in a color gamut in accordance with color characteristics of an image.

The present invention also provides a method and apparatus for an image adaptive color adjustment of pixels in a color gamut, in which a color conversion is performed in accordance with characteristics of the pixels of each image without performing and equal color conversion for all the images.

According to an aspect of the present invention, there is provided a method for an image adaptive color adjustment of pixels in a color gamut, the method including calculating a representative value that shows color characteristics of pixels included in a color gamut; calculating a final target color required to convert the representative value to approach a reference target point existing in the color gamut; and converting the pixels included in the color gamut to approach the final target color.

According to another aspect of the present invention, there is provided an apparatus for an image adaptive color adjustment of pixels in a color gamut, the apparatus including a color gamut boundary storage module which stores information on a color gamut boundary of a color gamut to be converted; a reference target point storage module which stores information on a reference target point of the color gamut; a target color determination module which calculates a representative value that shows color characteristics of the pixels included in the color gamut and calculates a final target color required to convert the representative value to approach the reference target point; and a color conversion module which converts the pixels included in the color gamut to approach the final target color.

BRIEF DESCRIPTION OF THE DRAWINGS

The above and other aspects of the present invention will be more apparent from the following detailed description of exemplary embodiments of the present invention taken in conjunction with the accompanying drawings, in which.

DETAILED DESCRIPTION OF EXEMPLARY EMBODIMENTS OF THE PRESENT INVENTION

Hereinafter, certain exemplary embodiments of the present invention will be described in detail with reference to the accompanying drawings. The aspects and features of the present invention and methods for achieving the aspects and features will be apparent by referring to the exemplary embodiments to be described in detail with reference to the accompanying drawings.

However, the present inventive concept is not limited to the exemplary embodiments disclosed hereinafter, but can be implemented in diverse forms. The matters defined in the description, such as the detailed construction and elements, are nothing but specific details provided to assist those of ordinary skill in the art in a comprehensive understanding of the invention, and the present invention is only defined within the scope of the appended claims. In the entire description of exemplary embodiments of the present invention, the same drawing reference numerals are used for the same elements across various figures.

The present inventive concept will be described herein with reference to the accompanying drawings illustrating block diagrams and flowcharts for explaining a method and apparatus for image adaptive color adjustment of pixels in a color gamut according to exemplary embodiments of the present invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which are executed via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

Also, each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

Figure 1:
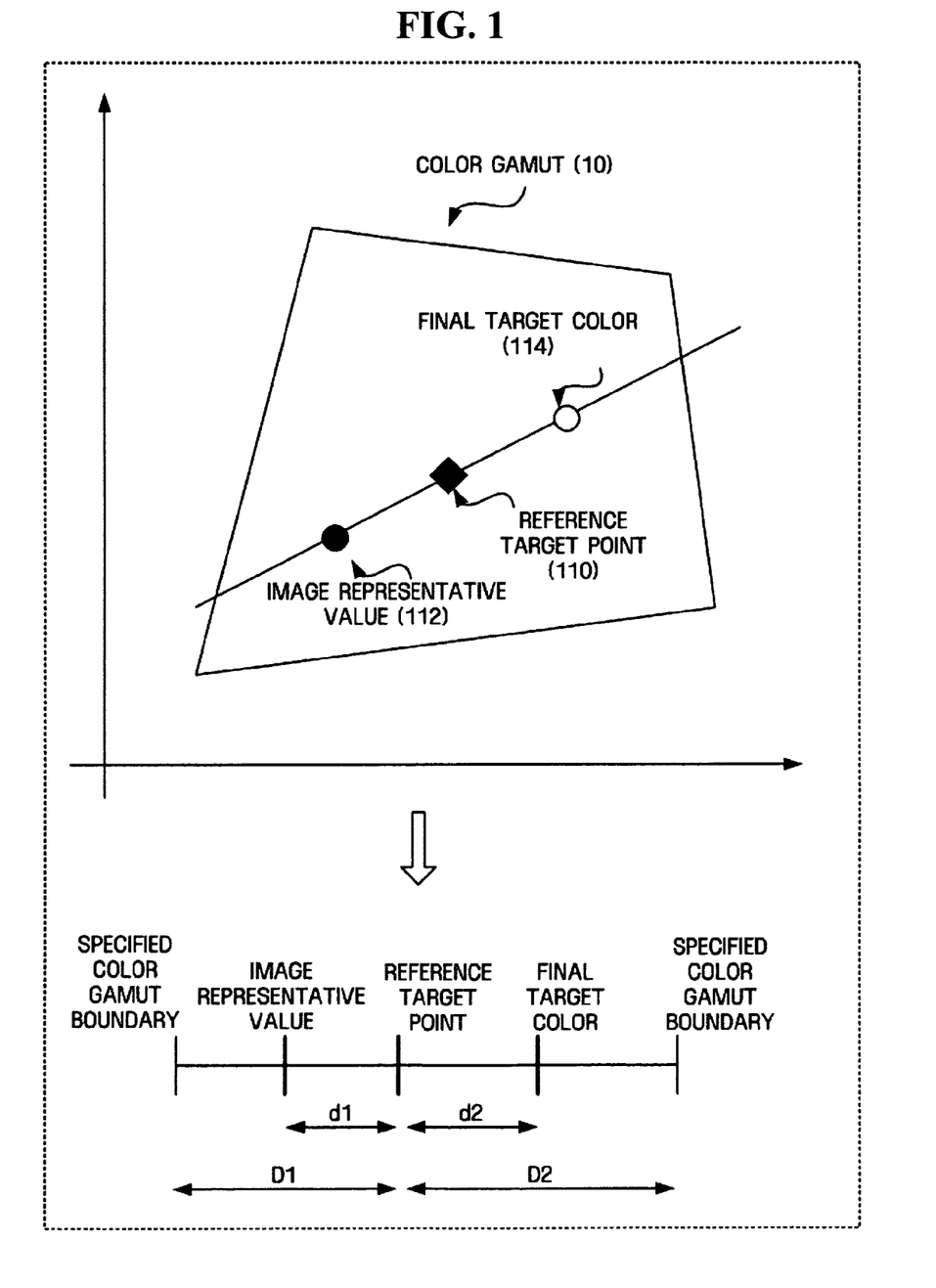
FIG. 1 is an exemplary view illustrating a color conversion process according to an exemplary embodiment of the present invention.

FIG. 1 is an exemplary view illustrating a color conversion process according to the exemplary embodiment of the present invention. A color gamut 10 represents a gamut of pixels for color conversion. Referring to FIG. 1, the color gamut 10 is bounded by four straight lines. However, the color gamut 10 may be bounded by oval or multi-dimensional functions. The color gamut 10 is not limited to a specified form but is delimited to divide pixels in distinction from pixels not to be converted.

Information on the color gamut 10 can be stored in a memory. Alternatively, information on the color gamut 10 can be updated in accordance with characteristics of a display device or software. Furthermore, information on the color gamut 10 may depend on external images.

A reference target point 110 exists in the color gamut 10. The reference target point denotes a target point where pixels included in the color gamut 10 are to be converted. The reference target point 110 serves as a target point of the color gamut 10.

As the color gamut 10 is commonly used for input images. If a boundary for determining whether pixels are to be converted is provided, an image representative value 112 can be obtained from the image inputted every time. The image representative value 112 is determined based on a representative value, such as an average value or an intermediate value or other similar value, of color values of pixels included in a specified color gamut, i.e., the color gamut 10, among all the pixels of the input image. Also, new target color coordinates are calculated to convert the image representative value 112 into the reference target point 110. The new target color coordinates serve as a final target color 114. If the image representative value 112 is converted using the final target color 114 as a target, a conversion result of the image representative value 112 approaches to the reference target point 110.

There may be various methods for calculating the final target color 114. As shown in FIG. 1, a final target color point can be calculated using distances d1, d2, D1, and D2 among the boundary of the color gamut 10, the image representative value, and the reference target point, which are on the same straight line. For example, the distance d2 between the reference target point and the final target color can be calculated using a proportional expression of d1:D1=d2:D2. In addition, the final target color can be calculated using various parameters.

If the final target color is determined, among the input images, color conversion of pixels existing in the color gamut is performed.

Figure 2:
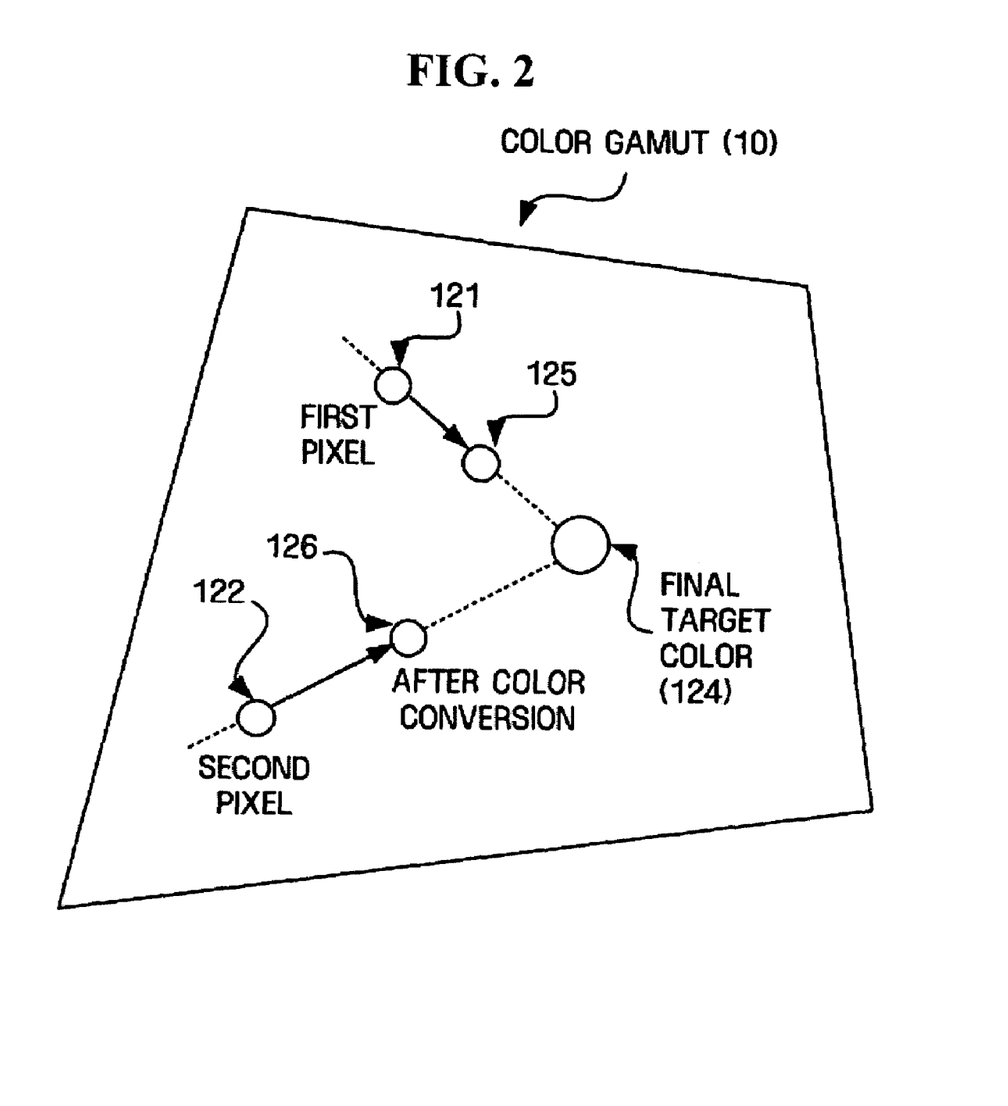
FIG. 2 is an exemplary view illustrating a color conversion process for pixels in a color gamut according to an exemplary embodiment of the present invention.

FIG. 2 is an exemplary view illustrating a color conversion process for pixels in the color gamut according to an exemplary embodiment of the present invention.

Referring to FIG. 2, conversion of two pixels, a first pixel 121 and a second pixel 122, existing in the color gamut 10 is shown. A final target color 124 is determined in accordance with a reference target point within the color gamut 10 and a representative value of pixels existing in the color gamut 10 of the image inputted by the process as illustrated in FIG. 1. The color conversion process of the first pixel 121 and the second pixel 122 into the final target color 124 is performed. As a result, color conversion results 125 and 126 are obtained. The color conversion results 125 and 126 approach to the reference target point in the color gamut 10. No color conversion occurs in the color gamut boundary and the target color, and the pixels successively move toward the target color therebetween.

On the other hand, since the input images have different color characteristics, the representative values extracted from the input images depend on the images. As a result, the final target color is varied depending on the images. Since the pixels undergo color conversion using the final target color, a color conversion direction is varied if the final target color is varied. Accordingly, adaptive color conversion can be performed for the input image.

Figure 3:
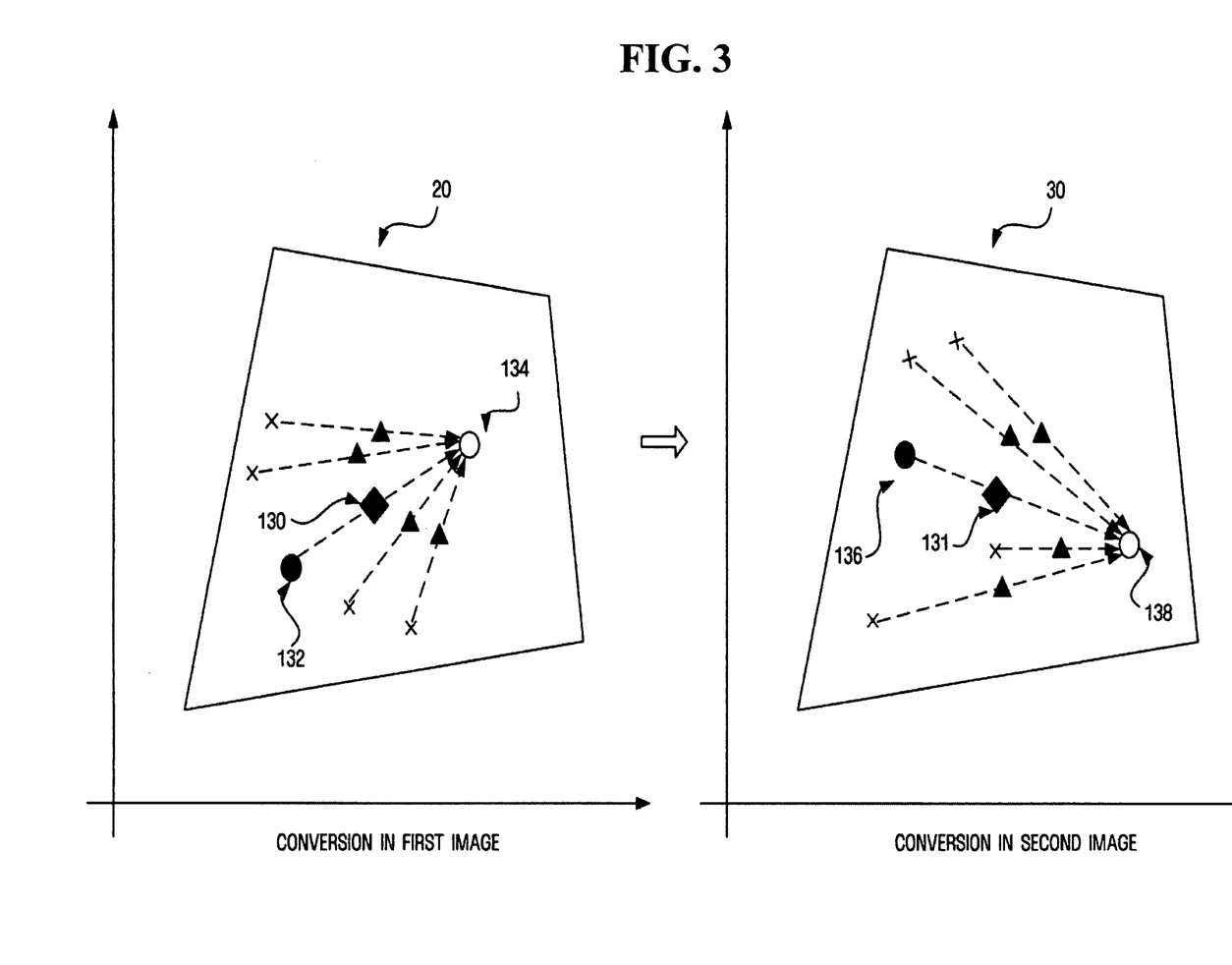
FIG. 3 is an exemplary view illustrating an adaptive color conversion process of an image according to an exemplary embodiment of the present invention.

FIG. 3 is an exemplary view illustrating an adaptive color conversion process of an image according to an exemplary embodiment of the present invention. If the first input image is inputted, a pixel included in a color gamut 20 is marked by X. A final target color 134 is obtained by a ratio of a reference target point 130 and a representative value 132 of pixels, and becomes a target point that converts pixels included in the color gamut 20. The conversion result of respective pixels approaches to the reference target point 130 as marked by ▲ shown in FIG. 3. On the other hand, color conversion in the second image has a target value different from that in the first image. A color gamut 30 is the same as the color gamut 20 used in the first image. Also, a reference target point 131 is the same as the reference target point 130 of the color gamut 20 used in the first image.

In the second image, unlike in the first image, the number of pixels included in the color gamut 30 and their color value are varied due to characteristics of the input image. Accordingly, a representative value 136 of the pixels in the second image is also different from that of the pixels in the first image. A final target color 138 of the second image obtained by the reference target point 131 and the representative value 136 becomes different from the final target color 134 of the first image, whereby the second image undergoes color conversion different from that of the first image.

Figure 4:
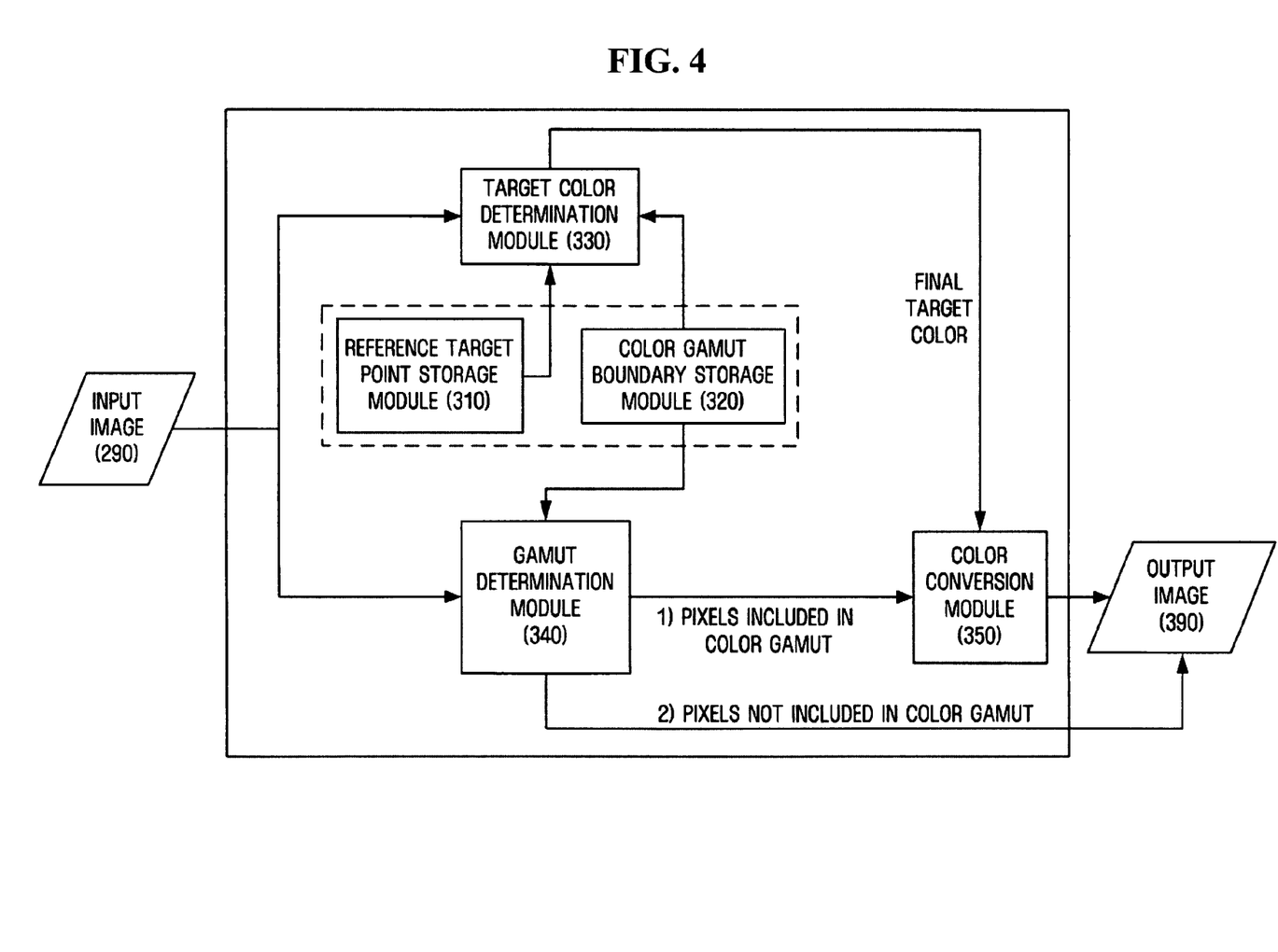
FIG. 4 is a block diagram illustrating constituent elements of an apparatus for image adaptive color adjustment of pixels in a color gamut according to an exemplary embodiment of the present invention.

FIG. 4 is a block diagram illustrating constituent elements of an apparatus for image adaptive color adjustment of pixels in a color gamut according to an exemplary embodiment of the present invention.

In exemplary embodiments of the present invention, the term "module", as used herein, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented so as to execute on one or more central processing units (CPUs) in a device.

Returning to FIG. 4, a color gamut boundary storage module 320 stores information on a color gamut in a storage medium such as a memory, hard disk, or similar storage medium. Information on the color gamut may be set as a default value when the apparatus is initially operated. The information on the color gamut may depend on user's setting.

Also, in the case of a graphic tool that processes image information, information required for color conversion and to be stored in the color gamut boundary storage module 320 may be set along with an image. For example, in order to improve a skin color reproduction function in an image having characters, information on a skin color gamut and a reference target point can be received along with the image.

A reference target point storage module 310 stores information on a target point which serves as a reference value of pixels existing in a color gamut of the color gamut boundary storage module 320. Information on the color gamut boundary and information on the reference target point are transmitted to a target color determination module 330 so that a representative value and a final target color are calculated from an input image 290.

The input image 290 is transmitted to a gamut determination module 340 that determines, with reference to information on the color gamut boundary storage module 320, whether each pixel of the input image 290 is included in the color gamut. Pixels included in the color gamut suggested by the color gamut boundary storage module 320 are outputted after undergoing color conversion thorough a color conversion module 350, while the other pixels are outputted as they are. As a result, an output image 390, which includes both pixels which have undergone color conversion and the other pixels, is outputted.

The input image 290 may be an image per frame in the case of a moving image. Alternatively, the input image 290 may undergo color conversion for a certain gamut within a frame. The gamut within the frame may be predetermined.

The construction of FIG. 4 may be one of a processor that converts an input image signal through a display device. Also, the construction of FIG. 4 may be realized by a graphic card to perform color conversion before an image is outputted to the display device. Further, the construction of FIG. 4 may be used in the case where an image is edited by software through a graphic editing tool. That is, the device of FIG. 4 may be a processor or a graphic card, or alternatively, the modules of FIG. 4 may be implemented only in software.

Figure 5:
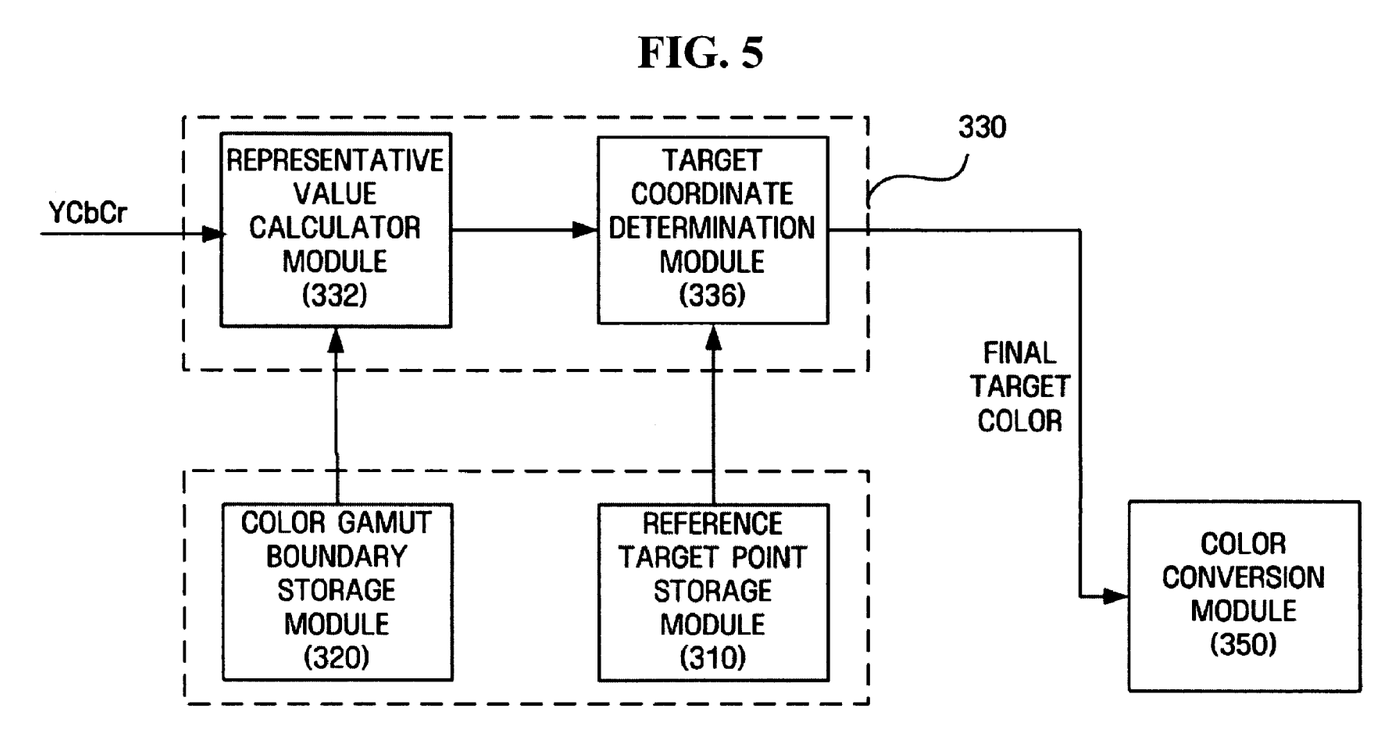
FIG. 5 is a block diagram illustrating constituent elements of a target color determination module according to an exemplary embodiment of the present invention.

FIG. 5 illustrates constituent elements of the target color determination module according to an exemplary embodiment of the present invention. The target color determination module 330 is provided with a representative value calculator module 332 and a target coordinate determination module 336.

The representative value calculator module 332 determines whether every pixel of the input image belongs to a specified color gamut, and outputs to the target coordinate determination module 336 a representative value of color values of pixels included in the specified color gamut.

The target coordinate determination module 336 calculates coordinates of a new final target color using the representative value inputted from the representative value calculator module 332 and information on the reference target point storage module 320. The final target color shown in FIGS. 1, 2 and 3 becomes new target color coordinates. The new target color coordinates are transmitted to the color conversion module 350, and are set as a parameter that allows pixels of the input image to undergo color conversion. The target color determination module 330 calculates the representative value of the input image and its target color coordinates. Accordingly, adaptive color conversion can be performed in accordance with color characteristics of the input image.

Figure 6:
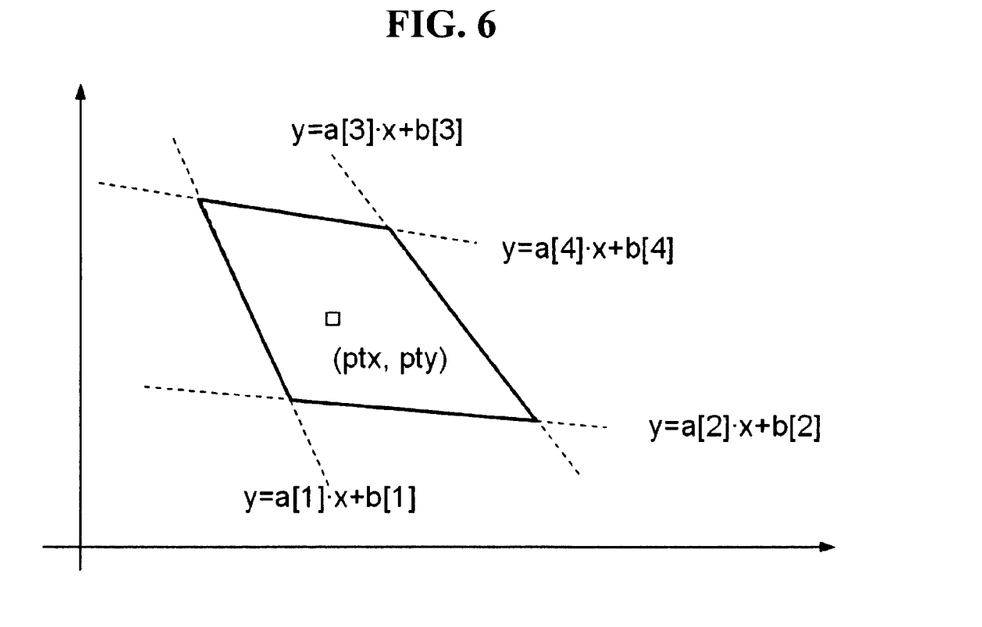
FIG. 6 is a view illustrating a process of reviewing whether pixels of an input image are included in a color gamut, through a gamut determination module according to an exemplary embodiment of the present invention.

FIG. 6 illustrates a process of reviewing whether the pixels of the input image are included in the color gamut, through the gamut determination module according to an exemplary embodiment of the present invention. Referring to FIG. 6, the color gamut is defined by four straight lines. Alternatively, the color gamut may be defined by an oval or circle type. In addition, the color gamut may be defined by two or more curves or a plurality of straight lines. In this way, the color gamut may be defined by various manners. Whether a pixel exists in the color gamut may be determined in accordance with the various manners which define the color gamut. The pixel may be predetermined.

For example, to identify whether pixels ptx and pty of the input image shown in FIG. 6 are included in the color gamut, it is possible to review whether to satisfy all the expressions listed in Equation (1).

$$pty > (a[1] \cdot ptx + b[1])$$

$$pty > (a[2] \cdot ptx + b[2])$$

$$pty < (a[3] \cdot ptx + b[3])$$

$$pty < (a[4] \cdot ptx + b[4]) \qquad (1)$$

It is noted that the pixels ptx and pty are located in the color gamut defined by the four straight lines when the expressions listed in Equation (1) are all satisfied.

Figure 7:
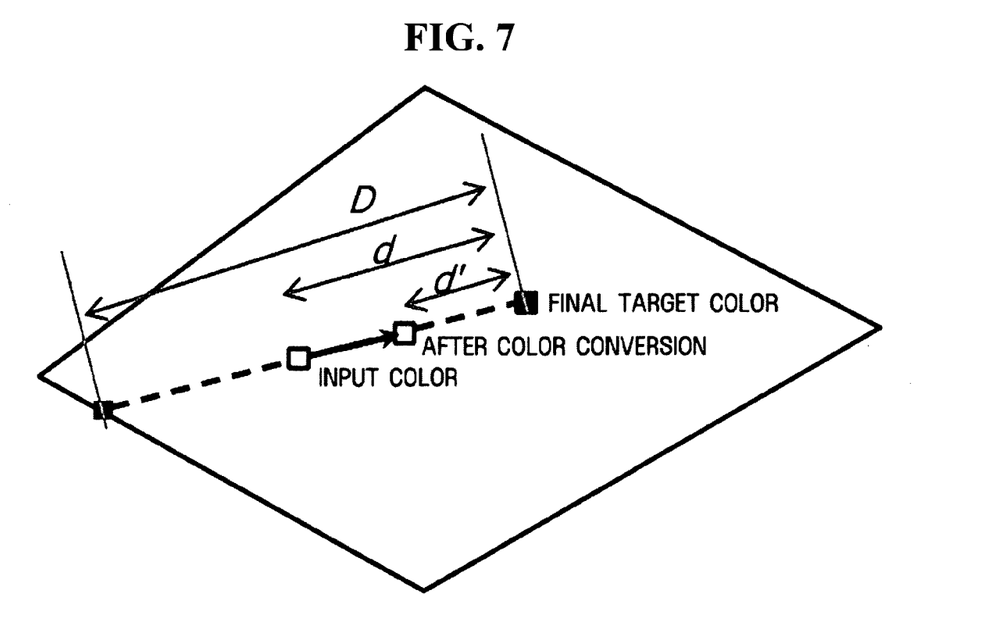
FIG. 7 is a view illustrating a color conversion process in a color conversion module according to an exemplary embodiment of the present invention.

FIG. 7 illustrates the color conversion process in the color conversion module according to an exemplary embodiment of the present invention. The target color is the final target color obtained by the target coordinate determination module. If the input color undergoes color conversion using the final target color, the color conversion result is located between the final target color and the input color. Equation (2) below can be used for color conversion.

$$d' = \frac{s}{D} \cdot d^2 + (1-s) \cdot d \qquad (2)$$

s: constant between 0 and 1

In Equation (2), d' is obtained by converting color characteristic information for the color conversion result of the input color into a position value, D denotes the distance between a straight line connecting the final target color with the input color and the color gamut boundary of the input color, and d denotes the distance between the input color and the final target color, wherein d' can be adjusted through a constant value "s".

Figure 8:
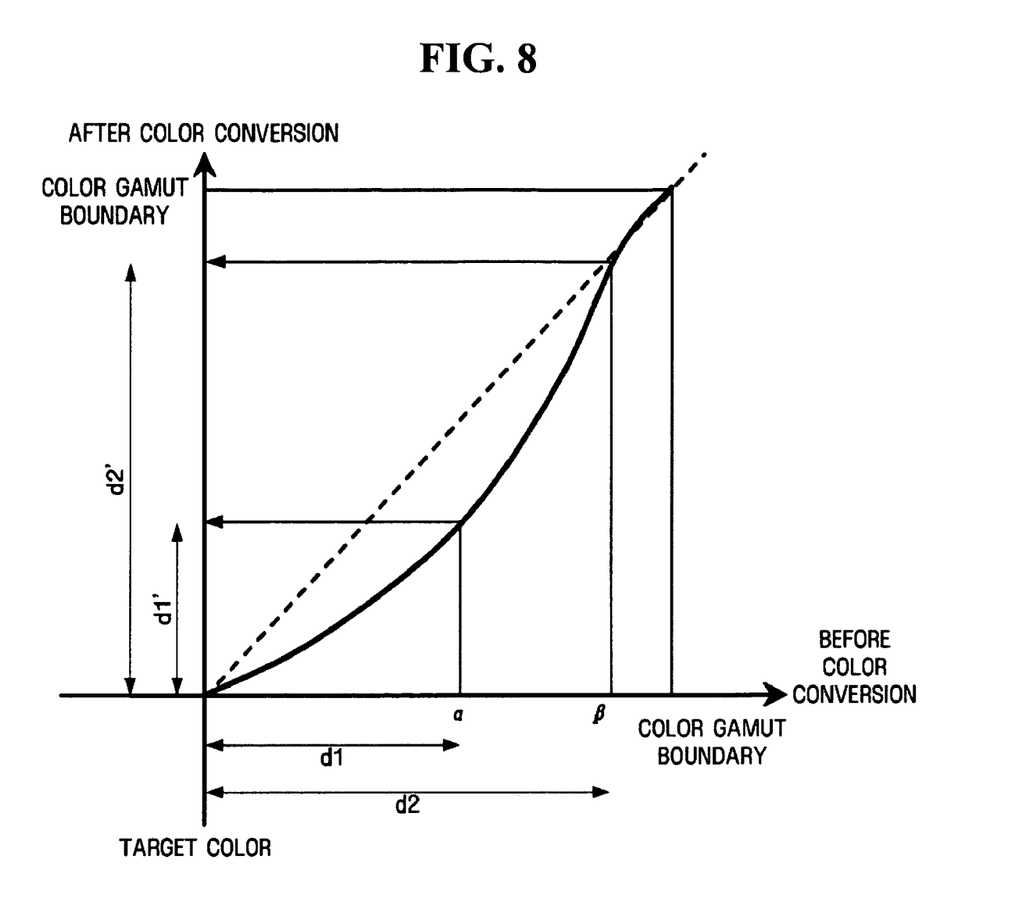
FIG. 8 is a graph illustrating a color conversion process according to an exemplary embodiment of the present invention.

FIG. 8 is a graph illustrating the color conversion process according to an exemplary embodiment of the present invention. In FIG. 8, the distance relation between color before the color conversion and color after the color conversion is shown. The difference between colors, which is caused by the color conversion, increases as the distance from the target color becomes longer. However, the difference between colors decreases toward the color gamut boundary. This is to prevent a color change from being remarkably generated on the color gamut boundary. For example, a point "α" is located at a middle point between the target color and the color gamut boundary. At this point "α", the difference (d1−d1') for the color conversion is great. However, at a point "β" close to the color gamut boundary, the difference (d2−d2') is not great.

Figure 9:
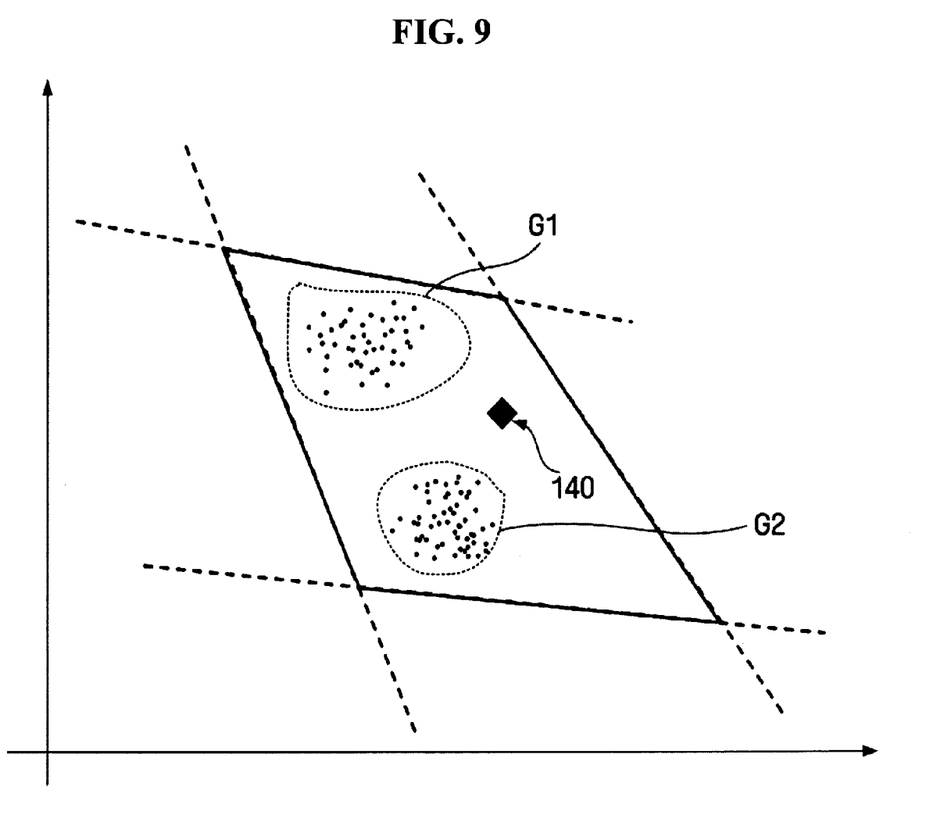
FIG. 9 is a view illustrating an example of calculating two or more representative values according to an exemplary embodiment of the present invention.

FIG. 9 illustrates an example of calculating two or more representative values according to an exemplary embodiment of the present invention.

The final target color used for conversion of pixels is calculated by calculating the representative value for pixels included in the specified color gamut of the input image. Referring to FIG. 9, the pixels are defined by two groups, G1 and G2. In this case, if one representative value is selected for the pixels included in the two groups, a proper effect caused by the conversion may not be obtained. If the final target colors of the two groups are different from each other based on a reference target point 140, the representative value is calculated for the groups and the final representative value for the groups is differently set to convert the pixels in the groups.

If the color gamut is not great, the pixels are not needed to be defined by groups because much time may be required to define the groups. However, if the pixels are needed to be definitely defined by groups, they can undergo the color conversion differently depending on the groups even though they are within the same image.

Whether to group the pixels can be determined in the process of calculating the representative value. The pixels may be defined by groups if a great dispersion or deviation is calculated from the difference between the representative value and other pixel values.

Figure 10:
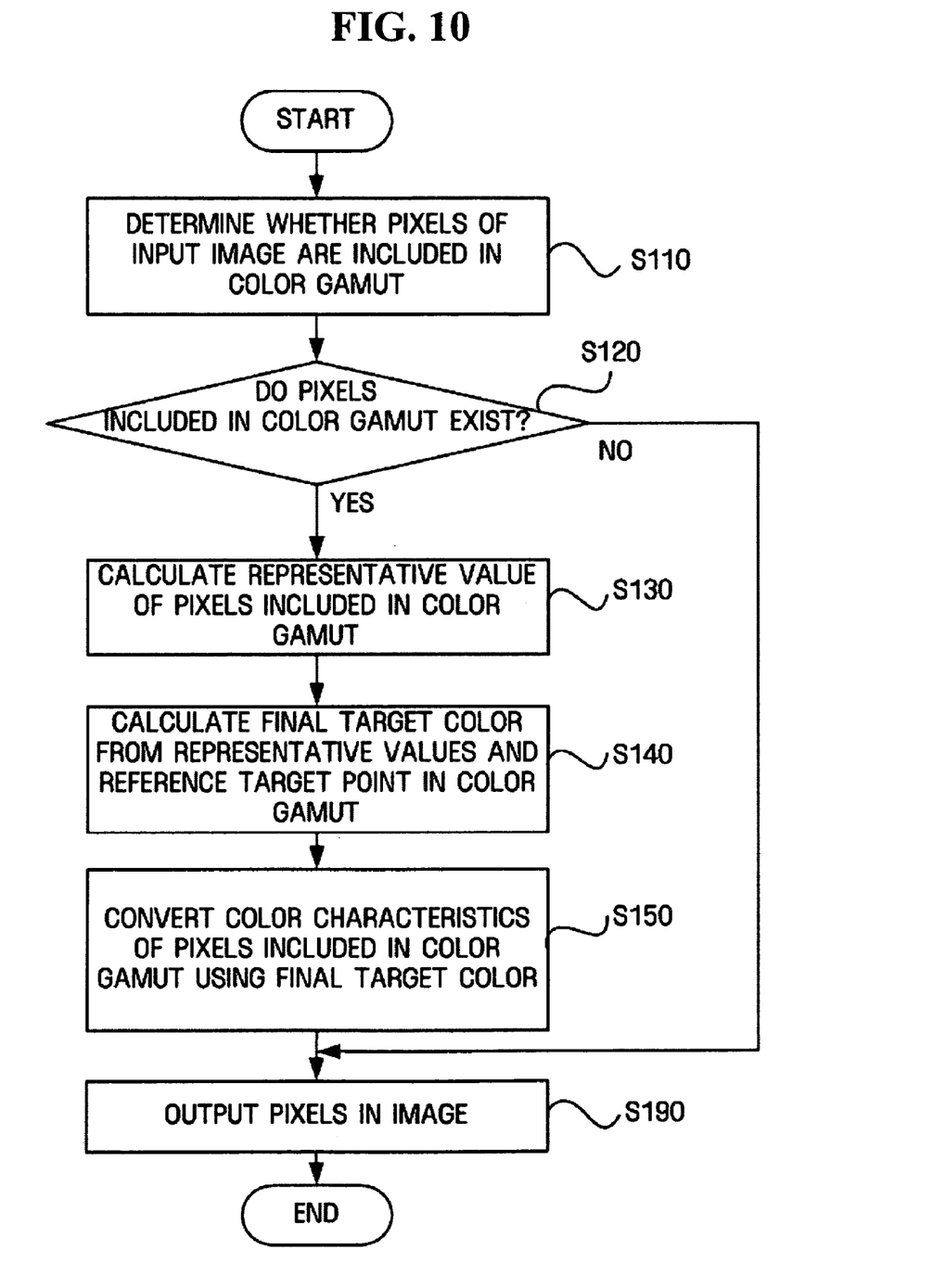
FIG. 10 is a flowchart illustrating adaptive color conversion of an image according to an exemplary embodiment of the present invention.

FIG. 10 is a flowchart illustrating adaptive color conversion of an image according to an exemplary embodiment of the present invention. If the image is inputted, it is determined whether the pixels for the input image are included in the color gamut (S110). At this time, the determining method depends on how the color gamut is defined. For example, if the color gamut is defined by the four straight lines as shown in FIG. 6, it is checked whether pixels exist on upper or lower sides of the four straight lines, whereby it is possible to identify whether the pixels exist in the gamut.

If the pixels exist in the gamut, the pixels are targets to be converted. Target pixels can be selected depending on how the color gamut is defined. For example, if the color gamut is defined by a closed curve such as an oval or a circle, an equation of an ellipse or an equation of a circle can be used. Alternatively, if the color gamut is defined by two or more curves of two or more-dimensional equations, it is possible to calculate where the pixels are located, based on the curves expressed by corresponding equations.

If the pixels included in the color gamut exist (S120), the corresponding pixels serve as targets to be converted. Accordingly, operations S130 to 150 are performed. On the other hand, since pixels not included in the color gamut are not needed to undergo color conversion, they can be outputted as they are S190. In this case, operation S190 includes outputting the pixels not included in the color gamut to the display device, outputting them from the graphic card to the display device, or storing the color conversion result using graphic editing software (graphic editor).

If it is determined that pixels included in the color gamut exist (S120), the representative value of the pixels included in the color gamut is calculated S130. The representative value may be calculated by various manners. For example, the representative value may be obtained by obtaining an average or intermediate value of numerical values representative of color characteristics of the pixels, or similar method. Alternatively, the greatest frequency value among the numerical values according to color characteristics of the pixels may be selected as the representative value. Since the representative value is calculated for the input images, it depends on groups if the pixels in the color gamut are defined by the groups as described with reference to FIG. 9.

The final target color is obtained from the relation between the representative value and the reference target point in the color gamut S140. As described with reference to FIG. 1 or 2, the point symmetrical to the representative value can be calculated as the final target color based on the reference target point serving as the central point. Also, the final target color can be calculated considering the relation with the color gamut boundary.

The pixels included in the color gamut are converted to approach the obtained final target color S150. Also, the input pixels undergo color conversion using the final target color as described with reference to FIG. 3 or 7. As a result, the color characteristic value of the pixels approaches to the reference target point between the final target color and the input pixels.

If color conversion is finished, the pixels in the image are outputted S190. In this case, the pixels not included in the color gamut are outputted directly or along with the converted target pixels.

The method of FIG. 10 can be used if the display device, the graphic card, or the graphic processor processes the image. Also, the method of FIG. 10 can be used for a digital camera, a digital camcorder, or a hard output device such as a printer. Furthermore, the image data stored in the graphic editing tool can be converted in accordance with the method of FIG. 10.

The aforementioned invention can be used to process specific colors. For example, the invention can be used to reproduce the skin color or convert a specific color from a natural image taken by a camera or the like.

As described above, in the method and apparatus for image adaptive color adjustment of pixels in a color gamut, an optimized target color is set for each image to maximize the reproduction effect of a preferred color. Also, since the color conversion is performed for one target point, it is possible to optimally reproduce the preferred color.

Exemplary embodiments of the present invention have been described for illustrative purposes, and those skilled in the art will appreciate that various modifications, additions and substitutions are possible without departing from the scope and spirit of the invention as disclosed in the accompanying claims. Therefore, the scope of the present invention should be defined by the appended claims and their legal equivalents.

What is claimed is:

1. A method for adaptive adjustment of pixels in a color gamut based on a reference target color implemented by an adaptive apparatus, the method comprising:

determining whether pixels of an input image are included in the color gamut to be converted using an equation of a straight line or an equation of a curve, which delimits the color gamut from another color gamut by a color gamut determination module, wherein the straight line or the curve form a color gamut boundary of the color gamut;

calculating a representative value that shows color characteristics of pixels included in a color gamut by a target color determination module;

calculating a final target color required to convert the representative value to approach a reference target point existing in the color gamut by a target color determination module; and converting the pixels included in the color gamut to approach the final target color by a color conversion module;

wherein the representative value, the reference target point and final target color is included in the color gamut defined by the color gamut boundary.

2. The method of claim 1, wherein the representative value comprises one of an intermediate value, an average value, and a highest frequency value of the color characteristics of the pixels included in the color gamut.

3. The method of claim 1, wherein the final target color is proportional to a distance between the representative value and the reference target point, and exists in a point symmetrical to the representative value on the basis of the reference target point.

4. The method of claim 1, wherein the calculating the representative value comprises calculating at least two representative values in accordance with a distribution of the pixels, and calculating the final target color comprises calculating at least two final target colors in accordance with the distribution of the pixels.

5. The method of claim 1, wherein the reference target color has color characteristics used to reproduce a skin color.

6. The method of claim 1, wherein the method is repeatedly performed if a new image is input after the converting of the pixels.

7. The method of claim 1, further comprising outputting an image that includes the converted pixels after the converting of the pixels.

8. The method of claim 1, further comprising storing an image that includes the converted pixels after the converting of the pixels.

9. An apparatus for adaptive adjustment of pixels in a color gamut based on a reference target color, the apparatus comprising:

a processor which controls the operation of,
a color gamut boundary storage module which stores information on a color gamut boundary of a color gamut to be converted;
a reference target point storage module which stores information on a reference target point of the color gamut;
a color gamut determination module which determines whether pixels of an input image are included in the color gamut defined by the color gamut boundary;
a target color determination module which calculates a representative value that shows color characteristics of the pixels included in the color gamut and calculates a final target color required to convert the representative value to approach the reference target point; and
a color conversion module which converts the pixels included in the color gamut to approach the final target color,
wherein the representative value, the reference target point and final target color is included in the color gamut defined by the color gamut boundary.

10. The apparatus of claim 9, wherein the gamut determination module determines whether the pixels of the input image exist in the color gamut using an equation of a straight line or an equation of a curve, which delimits the color gamut from another color gamut.

11. The apparatus of claim 10, wherein the equation of a straight line or the equation of a curve, the straight line or the curve form a color gamut boundary of the color gamut.

12. The apparatus of claim 10, wherein, if a new image is input, the gamut determination module newly determines whether pixels of the new image are included in the color gamut, and the target color determination module newly calculates the representative value and the final target color in accordance with the determined result of the gamut determination module.

13. The apparatus of claim 9, wherein the representative value comprises an intermediate value, an average value, or a highest frequency value of the color characteristics of the pixels included in the color gamut.

14. The apparatus of claim 9, wherein the final target color is proportional to a distance between the representative value and the reference target point, and exists in a point symmetrical to the representative value on the basis of the reference target point.

15. The apparatus of claim 9, wherein the target color determination module calculates at least two representative values in accordance with distribution of the pixels, and calculates at least two final target colors in accordance with the distribution of the pixels.

16. The apparatus of claim 9, wherein the reference target color has color characteristics used to reproduce a skin color.

17. The apparatus of claim 9, further comprising a display device for outputting a digital image.

18. The apparatus of claim 9, further comprising a graphic card that allows an input image signal to undergo the color conversion and outputs the converted image signal.

19. The apparatus of claim 9, further comprising graphic software that allows an input image signal to undergo the color conversion and outputs the converted image signal.

* * * * *